March 27, 1928.  1,664,101

A. O. AUSTIN

FORMING AND THREADING MACHINE

Filed Feb. 12, 1925  3 Sheets-Sheet 3

INVENTOR
Arthur O. Austin
BY Nissen & Crane
ATTORNEYS

Patented Mar. 27, 1928.

1,664,101

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

FORMING AND THREADING MACHINE.

Application filed February 12, 1925. Serial No. 8,825.

This invention relates to a machine for forming articles especially from plastic material and has for its object the provision of mechanism which shall be of improved construction and operation and which will permit of the formation of threads of various lengths and of accurate construction in the formed article.

The invention is exemplified in the combination and arrangement of parts shown in the accompanying drawings and described in the following specification and it is more particularly pointed out in the appended claims.

In the drawings—

Figure 1:
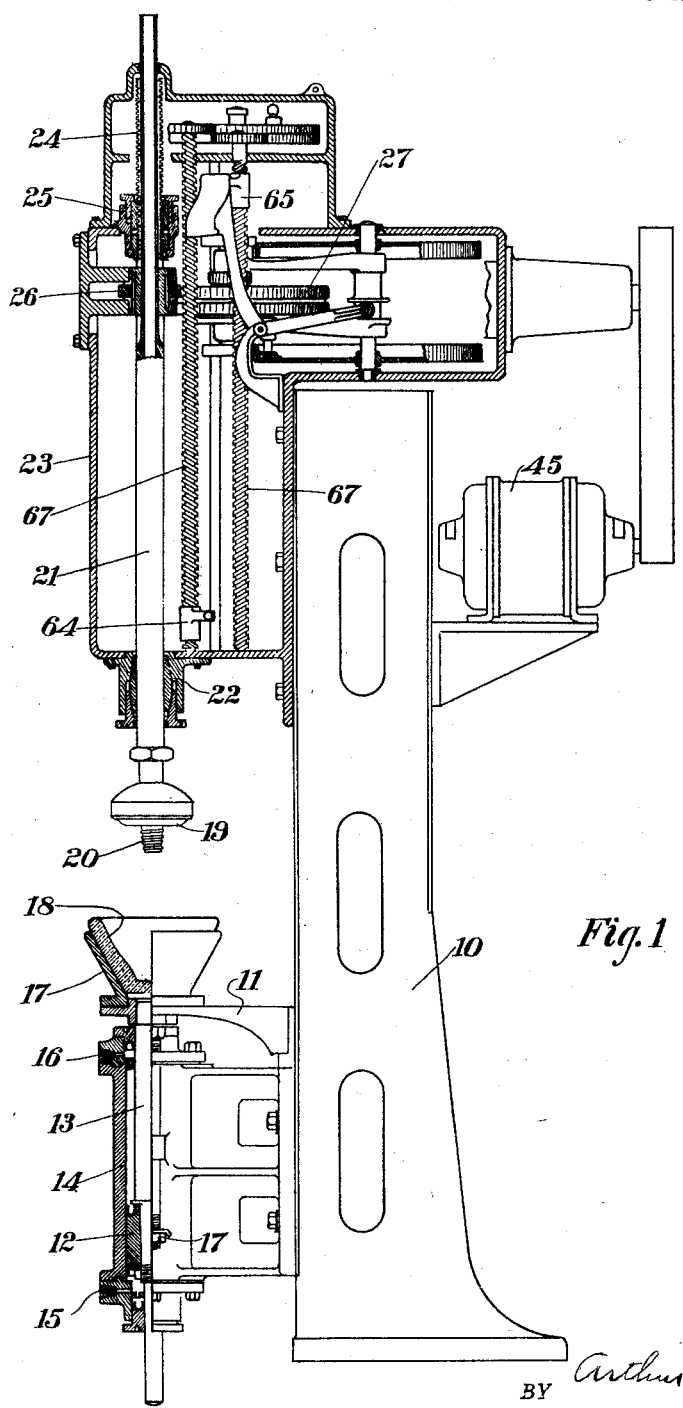
Fig. 1 is an elevation with parts in section showing one embodiment of the present invention.

In the formation of insulator parts having threaded pin holes it is desirable to be able to provide a threaded opening in which the threads will be accurately formed and extend to a definite depth in the article, because of the requirements of accuracy and uniformity in insulator parts and especially in parts for high voltage operation.

The present invention is especially applicable to forming articles of this nature but it will be understood that it is not confined to the formation of any particular class of ware.

In the embodiment of the invention illustrated in the drawing, the numeral 10 designates a supporting standard or frame having a bracket 11 mounted to slide vertically thereon and supported by a piston 12 and piston rod 13. The piston 12 operates in a cylinder 14 and is moved by suitable fluid pressure introduced into the cylinder through openings 15 and 16. An adjustable limit stop 17 fixes the upper limit of movement of the piston 12. At the upper end of the piston rod 13 is a pot 17 for receiving a mould 18. A forming tool or die 19 is arranged in registration with the mould 18 and is movable downwardly to form the interior of an article from plastic material placed in the mould 18. The plastic material used in forming insulators is generally a suitable clay for producing porcelain insulators but it will be understood that the apparatus may be used to operate upon a great variety of materials other than clay. The forming tool 19 is provided with a threaded tap 20 for forming threads in the work. A spindle 21 supports the tool 19 and is journaled in a bearing 22. Operating mechanism for the spindle 20 is enclosed in a housing 23 which is preferably made sufficiently tight to retain a lubricating medium. The upper end of the spindle 21 is provided with a threaded portion 24 which engages a nut 25 carried by the housing 23. A pinion 26 is splined on the upper end of the spindle 21 to rotate the spindle while permitting longitudinal movement thereof. The pinion 26 meshes with a gear 27 carried by a shaft 28. A second gear 29 is secured to the shaft 28 adjacent to the gear 27 and concentric therewith. The gear 27 is provided with internal and external teeth 30 and 31, the teeth of each set being of the same pitch. The gear 29 is also provided with internal and external teeth 32 and 33 having the same pitch as the teeth of the gear 27. The gear 29 instead of being continuous is interrupted to provide a gap 34, there being curved lines of teeth 35 connecting the sets of teeth 32 and 33 at each end of the gap 34. A pinion 36 is journaled at the end of an arm 37 in position to mesh with the teeth of the gear 29. A link 38 is pivoted concentrically with the pinion 36 and is provided with a pin 39 arranged to travel in a groove 40 positioned between the sets of teeth 32 and 33.

It will be seen that when the pinion 36 reaches the gap 34 it will be constrained to follow the line of the teeth 35 from the internal to the external teeth of the gear 29 or vice versa. The arm 37 is pivoted to swing about a fixed axis 41 to permit the pinion 36 to travel through the gap 34 from one side of the gear 29 to the other. It will be apparent that if the pinion 36 is driven to rotate continuously in a given direction it will drive the gear 29 in one direction until the curved line of teeth 35 comes into mesh with the pinion 36 whereupon the movement of the pinion 36 to the opposite side of the gear 29 will reverse the direction of rotation of this gear. The curved line of the teeth 35 will permit of the gradual retardation and acceleration of the driven gear 29 at the end of a reciprocating movement. The pinion 36 is driven by a gear 42 journaled to rotate about the pivotal center 41. This gear is driven by a pinion 43 on a countershaft 44 which in turn is driven by suitable connection with a motor 45. The gear 42 meshes with a pinion 46 secured to the shaft 47 to which the pinion 36 is attached. A pinion 48 similar to pinion 43 is also attached to the shaft 44 and meshes with a gear 49 similar to gear 42. The gear 49 drives a pinion 50 on a shaft 51 which in turn drives a pinion 52 similar to pinion 36. The pinion 52 is adapted to engage with the internal or external teeth of the gear 27 but the teeth of this gear are continuous and not interrupted as are the teeth of the gear 29. The shaft 51 is journaled in an arm 53 carried by a yoke 54 formed rigid with the arm 37. The yoke 54 may be shifted along the shaft 41 to bring either the pinion 36 or the pinion 52 into operative relation with its driven gear. It will be apparent that at any period when the pinion 36 is removed from the gap 34, the yoke 54 may be shifted to transfer the driving connection from the pinion 36 to the pinion 52 and when so shifted the driven gears 27 and 29 will continue to operate uninterruptedly. In operation, the pinion 52 may be used to rotate the shaft 28 continuously in one direction until it is desired to reverse the shaft whereupon the yoke 54 may be shifted upwardly to bring the interrupted gear 29 into operation. As soon thereafter as the pinion 36 comes into registration with the gap 34, the direction of rotation of the shaft 28 will be reversed. After reversal the yoke 54 may again be shifted downwardly since the pinion 52 will be swung laterally during the travel of the pinion 36 about the curved teeth 35. When the yoke 54 is thus shifted, the shaft 28 will continue to rotate in its reversed direction so long as the pinion 52 is permitted to remain in mesh with its driven gear.

The construction illustrated, provides means for periodically shifting the driven connection to the interrupted gear 29 to reverse the direction of rotation of the shaft 28. The apparatus may be adjusted to permit the pinion 52 to remain in driving position for different periods but it is apparent that each period must comprise a definite number of turns of the shaft 28 so that the yoke 54 will not be shifted while the gear 36 is passing through the gap 34.

The mechanism for shifting the yoke 54 comprises a lever arm 55 having rollers 56 for engaging a groove 57 in the yoke 54. The arm 55 is pivoted at 58 and is provided with an upwardly extending portion 59 provided with two sets of cam grooves 60 and 61 at its upper end. The grooves 60 and 61 are arranged to receive rollers 62 and 63 respectively carried by travellers 64 and 65 threaded on shafts 66 and 67 respectively. An upright rod 68' engages the runners 64 and 65 to prevent rotation thereof. The shafts 66 and 67 are driven by gears 68 and 69 respectively mounted on the shaft 28. The shafts 66 and 67 are oppositely threaded so that the runners 64 and 65 will move in opposite directions thereon and at the same rate of speed.

Figure 2:
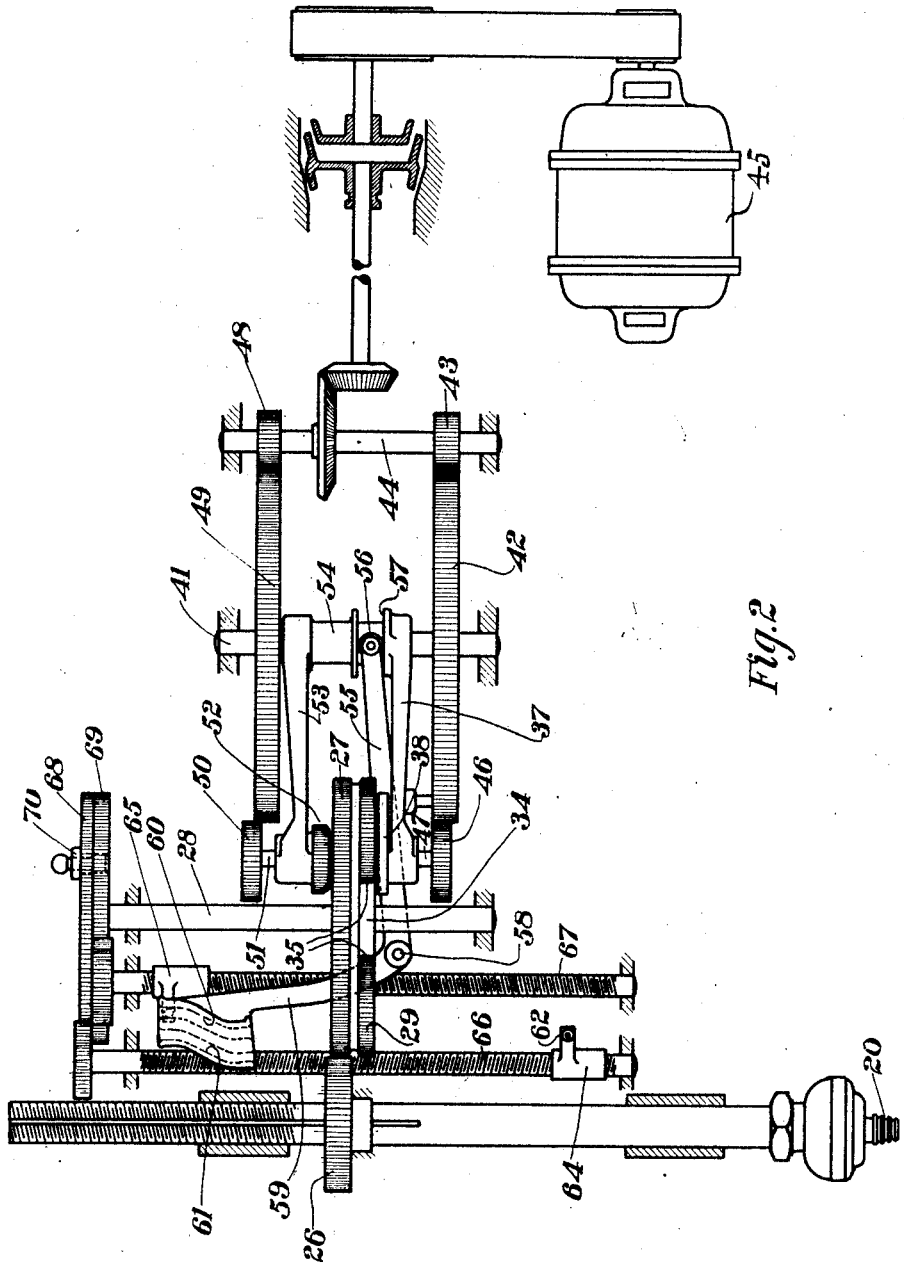
Fig. 2 is a diagrammatic elevation to illustrate a portion of the operating mechanism.
Figure 3:
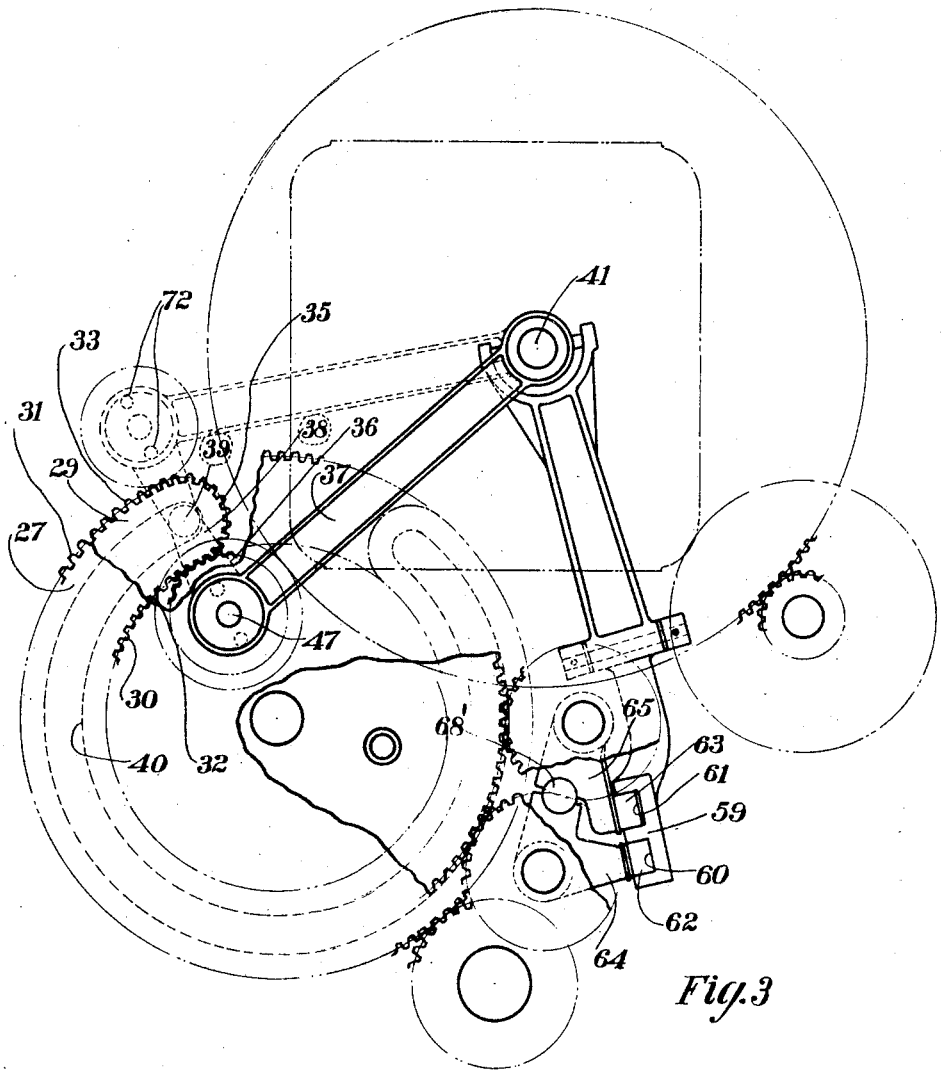
Fig. 3 is a diagrammatic plan view of the mechanism shown in Fig. 2.
Figure 4:
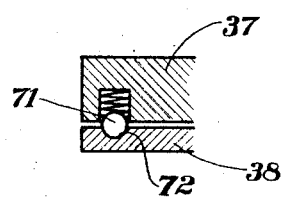
Fig. 4 is a fragmentary sectional view of a detail of construction.

In the position of the parts shown in Fig. 2, the runner 65 is in position to move downwardly. This movement will shift the arm 59 to the right as viewed in Fig. 2, thus bringing the pinion 52 into mesh with its gear 27 to continue the rotation of the gears 27 and 29 in their present direction of rotation. As the runner 65 reaches the cam groove 60 it will move the cam groove 61 into position to receive the roller 62 on the runner 64 as the runner 64 moves upwardly. The shaft 28 will be driven in a continuous direction and the runner 64 is driven along the screw 66 to engage the cam groove 61 and force the cam groove to the left into the position shown in Fig. 2. At this time the runner 65 will be at the botom of the shaft 67. This movement of the lever 59 will again bring the pinion 36 into mesh with the interrupted gear 29 so that a further slight rotation will reverse the direction of the shaft 28. This operation will be repeated each time either of the runners engages the cam grooves in the lever 59. The gears 68 and 69 are held in fixed position relative to one another by a pin 70. If it is desired to change the period during which the shaft 28 and consequently the tap 20 is driven in one direction, this may be done by removing the pin 70 and rotating the gears 68 and 69 relative to one another to change the relative position of the runners 64 and 65 on their respective shafts. Only one set of openings will be provided for the pin 70 so that it will be necessary to shift the runners, amounts corresponding to the complete rotation of the shaft 28. Since the spindle 21 is advancing or retracting, depending upon its direction of rotation, it will be apparent that the mechanism will advance the forming tool 19 to a definite position and when it has reached its limiting position of advancement it will be automatically stopped and retracted and at the same time its direction of rotation will be reversed so that the tap 20 will be unscrewed from the threads formed in the plastic material. The amount which the forming tool is advanced prior to reversal may be alternated by shifting the position of the runners 64 and 65 on the threaded members 66 and 67. When the yoke 54 is shifting downwardly to withdraw the pinion 36 from engagement with its driven gear, the link 38 will be moved out of engagement with the guide 40. In order to retain the link 38 in fixed relation with the arm 37 until the pinion is again brought into mesh with its driven gear, the arm 37 is provided with a spring detent ball 71 which is arranged to engage one or the other of a pair of depressions 72 in the link 38. This detent ball will yield to permit rotation of the link 38 upon the shaft 47 when the pinion 36 is travelling about the teeth 35. As soon as the gear 36 has reached either one or the other of its limiting positions the detent will automatically spring into position to prevent the link 38 from swinging movement relative to the arm 37.

I claim—

1. In combination a thread forming device, a continuous drive for said device, a periodically reversing drive for said device, and means for connecting said device with either of said drives.

2. In combination a thread forming device, driving mechanism for said device including means for reversing said device while maintaining uninterrupted driving connection of said driving mechanism with said device to cause it to operate alternately in opposite directions, and means for driving said device continuously different predetermined amounts between the reversals thereof.

3. In combination a thread forming device, threaded means for advancing said device when said device is rotated, and driving mechanism for rotating said device, said driving mechanism including a continuous drive and means for reversing said continuous drive at definite predetermined positions of said device, said reversing means being arranged to maintain uninterrupted driving connection with said device during reversal of said continuous drive.

4. In combination a thread forming device, means for advancing said device when rotated in one direction and for retracting said device when rotated in the opposite direction, and mechanism for rotating said device, said mechanism comprising a continuous drive and means for reversing said continuous drive at definite predetermined positions of said continuous drive, said reversing means being arranged to maintain uninterrupted driving connection with said device during reversal of said continuous drive.

5. In combination a thread forming device, means for advancing and retracting said device respectively when said device is rotated in opposite directions, and mechanism for rotating said device, said mechanism comprising a pair of racks, a pinion for driving said racks and means for shifting said pinion from one to the other of said racks to reverse said thread forming device at a definite position in the travel thereof, and means for driving said device different definite amounts between reversals thereof.

6. In combination, a thread forming device, means for advancing and retracting said device respectively when said device is rotated in opposite directions, and mechanism for rotating said device comprising a pair of racks and a pinion for driving said racks, said racks being connected at the ends thereof to permit said pinion to travel from one to the other of said racks to effect reversal of said driving mechanism and means for disconnecting said pinion from said racks to permit continuous operation of said device.

7. In combination, a thread forming device, a spindle for rotating said device, threaded means for moving said spindle longitudinally when rotated, and mechanism for rotating said spindle comprising a gear having internal and external gear teeth thereon, a pinion for meshing with said gear, means for shifting said pinion from one to the other of said sets of teeth to effect reversal of said gear, and means for driving said spindle independently of said shifting pinion.

8. In combination, a forming tool for plastic material, a spindle for rotating said tool, threaded means for moving said spindle longitudinally when rotated, and mechanism for rotating said spindle, said mechanism comprising a gear having internal and external sets of teeth thereon, each of said sets having a gap therein, the teeth of one set being connected to the teeth of the other set at each end of said gap by gear teeth arranged on a curved line, a pinion for meshing with the said sets of gears, and means for constraining said pinion to follow the line of curvature of said gear teeth when it reaches said gap to effect reversal of said gear, and means for driving said spindle different predetermined amounts between reversals thereof.

9. The combination with a thread forming tool, of a spindle for operating said tool, threaded means for moving said spindle longitudinally when rotated, and mechanism for rotating said spindle, said mechanism comprising a train of gearing having a gear for continuous rotation and an interrupted gear for reversing the rotation of said spindle, and means for connecting either one or the other of said gears in said train.

10. In combination, a thread forming tool, a spindle for driving said tool, threaded means for moving said spindle longitudinally when said spindle is rotated, and mechanism for rotating said spindle, said mechanism comprising a rotary drive for said spindle having a continuous gear thereon and an interrupted gear thereon, a pair of driving pinions and means for moving one of said pinions into engagement with said continuous gear to effect continuous rotation of said spindle or for moving the other of said pinions into mesh with said interrupted gear to effect reversal of the direction of rotation of said spindle.

11. The combination with a thread forming tool of a spindle for rotating said tool, and driving mechanism for said spindle, said driving mechanism comprising a continuous gear for effecting continuous rotation of said spindle, an interrupted gear for effecting reversal of said spindle, driving means for said gear and means for selectively connecting the said driving means with said continuous or interrupted gear.

12. In combination, a thread forming tool, a spindle for driving said tool, and means for rotating said spindle, said means comprising a continuous drive for said spindle, a reciprocating drive for effecting reversal of said spindle and mechanism for selectively connecting said continuous drive and said reversing drive to said spindle and retaining said continuous drive in operative connection with said spindle different predetermined amounts between reversing operations of said reciprocating drive.

13. The combination with a thread forming device, of a spindle for driving said device, and means for rotating said spindle, said means comprising a continuous drive for said spindle, a reciprocating drive for reversing said spindle and means connected with said spindle to operate in unison therewith for alternately effecting connection of said spindle with said continuous and reversing drives and for maintaining connection with said continuous drive for different predetermined amounts of movement between reversing operations by said reciprocating drive.

14. In combination, a thread forming device, a spindle for driving said device, threaded means for moving said spindle longitudinally when said spindle is rotated, and driving mechanism comprising a continuous gear, an interrupted gear for effecting reversal of rotation of said spindle, a pair of pinions for respectively engaging said gears, and means controlled by the movement of said spindle for selectively connecting said pinions with their respective gears.

15. In combination, a thread forming tool, a spindle for operating said tool, threaded means for moving said spindle longitudinally when rotated, and mechanism for rotating said spindle, said mechanism comprising a continuous gear having internal and external teeth, an interrupted gear having internal and external teeth, a pair of pinions for engaging said gears respectively, said interrupted gear acting to effect reversal of both of said gears when enmeshed with its pinion at the point of interruption therein, and means for shifting said pinions when said interrupted gear is operating at a point therein removed from the point of interruption to transfer the driving connection from said interrupted gear to said continuous gear.

16. In combination, a thread forming tool, a spindle for operating said tool, threaded means for moving said spindle longitudinally when said spindle is rotated, and driving mechanism for rotating said spindle, said driving mechanism comprising a continuous gear having internal and external teeth, an interrupted gear having internal and external teeth, a pair of pinions for respectively engaging said gears, a swinging yoke for constraining said pinions to move about a common center, and mechanism controlled by said spindle for shifting said yoke to transfer the driving connection from one of said gears to the other, said transferred mechanism being adjustable to provide different predetermined periods of operation by said continuous gear between reversing operations effected by said interrupted gear.

17. The combination with a forming die, of a drive therefor, reversing means for said drive arranged to effect reversal of the direction of movement of said drive while maintaining uninterrupted driving connection thereof with said die and mechanism for rendering said reversing means effective at predetermined intervals in the operation of said drive.

18. The combination with a thread forming device, of means for advancing said device when rotated, driving mechanism for rotating said device, reversing means for said driving mechanism arranged to effect reversal of the direction of movement of said driving connection while maintaining uninterrupted driving connection between said driving mechanism and device, and adjustable mechanism for rendering said reversing means effective at different predetermined intervals in the operation of said driving mechanism.

19. The combination with a thread forming tool, of a spindle for rotating said tool, means for advancing and retracting said spindle when rotated in opposite directions respectively, a drive for rotating said spindle, mechanism for reversing said drive arranged to effect reversal thereof while maintaining uninterrupted driving connection between said drive and spindle, and adjustable means having driving connection with said spindle for rendering said reversing mechanism effective at different predetermined positions in the operation of said thread forming tool.

20. The combination with a thread forming tool of a spindle for operating said tool, means for advancing and retracting said spindle when rotated in opposite directions respectively, a drive for rotating said spindle and means for reversing said drive, said reversing means comprising a traveller arranged to effect reversal of said drive at one position in its path of travel, and an actuator for said traveller having driving connection with said spindle to return said traveller to said reversal position at predetermined intervals in the operation of said spindle.

21. The combination with a thread forming tool, of a spindle for operating said tool, threaded means for moving said spindle longitudinally when rotated, a drive for rotating said spindle, a traveller for effecting reversal of said drive, and a screw having driving connection with said spindle for actuating said traveller.

22. The combination with a thread forming tool, of a spindle for operating said tool, threaded means for moving said spindle longitudinally when rotated, a drive for rotating said spindle, reversing mechanism for said drive, and means having driving connection with said spindle for effecting reversal of said drive at different intervals in the operation of said tool, said means comprising a pair of screws, travellers carried by said screws and a contact member engaged by said travellers for controlling said reversal means, said travellers being relatively adjustable on said screws to vary the interval between reversals of said drive.

In testimony whereof I have signed my name to this specification on this 7th day of February, A. D. 1925.

ARTHUR O. AUSTIN.